(12) United States Patent
Duzac

(10) Patent No.: US 7,187,560 B1
(45) Date of Patent: Mar. 6, 2007

(54) METHOD AND APPARATUS FOR SUPPORTING A CABLE CONNECTED TO A CIRCUIT BOARD ASSEMBLY

(75) Inventor: Rene Duzac, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 326 days.

(21) Appl. No.: 10/658,696

(22) Filed: Sep. 9, 2003

(51) Int. Cl.
*H02B 1/20* (2006.01)

(52) U.S. Cl. ...................................... 361/826

(58) Field of Classification Search ............. 174/65 R, 174/135; 361/828, 727, 826
See application file for complete search history.

(56) References Cited

U.S. PATENT DOCUMENTS

| | | | |
|---|---|---|---|
| 6,396,992 B1 * | 5/2002 | Debal | 385/135 |
| 6,568,542 B1 * | 5/2003 | Chen | 211/26 |
| 6,621,692 B1 | 9/2003 | Johnson et al. | 361/683 |
| 6,679,722 B1 * | 1/2004 | Pulizzi | 439/451 |
| 6,791,841 B1 | 9/2004 | Tirrell et al. | 361/724 |

\* cited by examiner

*Primary Examiner*—Dean Richard
*Assistant Examiner*—Ivan Carpio
(74) *Attorney, Agent, or Firm*—BainwoodHuang

(57) ABSTRACT

A circuit board assembly has an attached support assembly. The support assembly includes a support, such as a handle, and a lip substantially perpendicular to the support. The lip strengthens the support such that, as a cable exerts a load on the support assembly, the lip limits deflection of the support relative to the circuit board assembly. In the case where a cable having a cable connector attaches to a port of the circuit board assembly, the support assembly minimizes displacement of the cable connector relative to the port, thereby minimizing the potential for a break in electrical connections formed between the connector and the port. The support assembly also, in such a case, minimizes strain on a wire bundle and over-molded case forming the cable, thereby limiting damage to the over-molded case and disconnection of the wire bundle to the connector that leads to losses in electrical connections formed between the circuit board assembly and computer devices connected to the circuit board assembly.

27 Claims, 7 Drawing Sheets

METHOD AND APPARATUS FOR SUPPORTING A CABLE CONNECTED TO A CIRCUIT BOARD ASSEMBLY

BACKGROUND

Conventional computer systems typically include expansion slots that allow a user to connect various types of card assemblies to the computer systems. A typical card assembly includes a circuit board having a circuit board connector and a faceplate attached (e.g., riveted) to the circuit board. For example, a user inserts a typical card assembly within a respective expansion slot of a computer system and engages the circuit board connector of the card assembly with a backplane of the computer system, thereby allowing the card assembly to interact (e.g., electrically communicate) with the computer system. The user fastens the faceplate of the card assembly to the computer system to secure the card assembly to the computer system.

The conventional card assembly has a handle secured to the card assembly. For example, a typical handle attaches to both the faceplate and circuit board of the card assembly using fasteners, such as rivets. The handle is typically formed from a relatively thin (e.g., approximately 0.032 inches thick), metal (e.g., steel) material and provides a user with a grasping interface for the card assembly when the user inserts or removes the card assembly from the rack.

Certain card assemblies provide networking capabilities to the computer system. For example, such typical network card assemblies include wide area network interface cards (WIC's) and high-speed interface cards (HWIC's). A network card assembly typically has a port that allows a user to connect a cable connector, such as a Very High Density Connector Interface (VHDCI) connector, of a cable to the network card assembly. The port, cable connector, and cable provide an interface between the network card assembly and an external computerized device, such as a computer network device.

In the case where the card assembly has a port to allow connection of a cable connector of a cable, such as a network card assembly, the handle contacts the cable connected to the card assembly. For example, when a user connects a cable connector of a cable into a port of a network card assembly, the cable contacts the handle of the card assembly and generates a load on the handle. The handle, therefore, acts to support the weight of the cable and aids in maintaining the connection between the port of the card assembly and the cable connector.

SUMMARY

Conventional techniques for supporting a cable connected to a card assembly suffer from a variety of deficiencies.

For example, as described above, the handle of the card assembly supports the weight of a cable having a cable connector attached to a port of the card assembly. Conventional card assembly handles, however, are formed from a relatively thin, stamped metal material. In the case where the cable connected to the card assembly has a relatively large weight, such as the case for an octopus cable of a VHDCI connector, the cable generates a relatively large load on the handle and causes the handle to bend or deflect relative to the card assembly. Deflection of the handle, in turn, causes the cable to place a strain on the connector at the connector-port interface and, thereby, deflects the connector relative to the port and breaks electrical connections formed between the connector and the port. For example, assume the card assembly is a network card assembly, and the connector is a VHDCI connector. Deflection of the connector by approximately 0.020 inches relative to the port can break electrical connections formed between the connector and the port, thereby causing user devices connected to the network card assembly to lose their respective network connections.

While the weight of a single cable can cause an associated handle to bend relative to the card assembly, the weight of multiple cables connected to respective multiple card assemblies can also cause an associated handle to bend relative to the card assembly. For example, conventional computer systems have multiple "stacked" expansion slots such that card assemblies mounted within the computer systems stack one above the other. The handle of a card assembly located at the bottom of the stack of card assemblies, therefore, receives the weight of all of the cables attached to the respective card assemblies locate above the bottom card assembly. Such a weight generates a relatively large load on handle of the bottom card assembly, thereby causing the handle to bend or deflect relative to the card assemblies of the computer system. Again, deflection of the handle causes the cables to deflect the respective connectors, relative to the respective ports, and break electrical connections formed between the connectors and the ports.

Conventional cables have multiple wires that carry signals between the card assembly and the user device. For example, certain cables have sixty-eight wires per connector where the bundle of wires inserts into a plastic over-molded case with an overall thickness of 0.315 inches. In the case where the handle of the card assembly supports a cable attached to the card assembly, deflection of the handle relative to the card assembly generates a strain on the wire bundle and over-molded case. Such a strain causes damage to the over-molded case and disconnection of the wire bundle to the connector, thereby breaking electrical connections formed between the card assembly and user computer devices connected to the card assembly.

In certain cases, the handle supports a cable weight greater than the material strength of the handle. In such cases, the weight of the cables breaks or disengages the handle from the associated card assembly. Disengagement of the handle from the card assembly causes difficulty to a user when inserting or removing the card assembly relative to the computer system (e.g., the user cannot easily insert or remove the card assembly from the chassis of the computer system).

Also as described above, the handle of the conventional card assembly conventionally attaches to both the faceplate and circuit board of the card assembly using fasteners, such as rivets. Such attachment provides a relatively secure connection between the card assembly and the handle. However, such attachment also requires two separate manufacturing procedures: a first procedure to attach the handle to the faceplate and a second procedure to attach the handle to the circuit board.

By contrast, embodiments of the present invention significantly overcome the described deficiencies and provide mechanisms for supporting a cable connected to a circuit board assembly. A circuit board assembly has an attached support assembly. The support assembly includes a support, such as a handle, and a lip substantially perpendicular to the support. The lip strengthens the support such that, as a cable exerts a load on the support assembly, the lip limits deflection of the support relative to the circuit board assembly. In the case where a cable having a cable connector attaches to a port of the circuit board assembly, the support assembly minimizes displacement of the cable connector relative to the port, thereby minimizing the potential for a break in electrical connections formed between the connector and the port. The support assembly also, in such a case, minimizes strain on a wire bundle and over-molded case forming the cable, thereby limiting damage to the over-molded case and disconnection of the wire bundle to the connector that leads to losses in electrical connections formed between the circuit board assembly and computer devices connected to the circuit board assembly.

In one arrangement, a support assembly for supporting a cable connected to a circuit board assembly has a support defining a first plane, a connection portion in communication with the support, the connection portion configured to couple with the circuit board assembly (e.g., configured to couple with a ground plane of the circuit board assembly), and a lip in communication with the support. The lip defines a second plane substantially perpendicular to the first plane defined by the support. The lip limits deflection of the support relative to the circuit board assembly when the connection portion couples with the circuit board assembly and the cable exerts a load on the support. By minimizing deflection of the support, the lip minimizes displacement of a cable connector of the cable relative to a corresponding port, thereby minimizing the potential for a break in electrical connections formed between the connector and the port.

In one arrangement, the lip of the support assembly defines a stop, the stop substantially perpendicular to the support and configured to abut a faceplate in communication with the circuit board assembly. The stop is configured to limit rotation of the support relative to the faceplate when the at least one cable exerts a load on the support. By limiting rotation of the support relative to the faceplate, the stop minimizes displacement of a cable connector of a cable relative to a corresponding port, thereby minimizing the potential for a break in electrical connections formed between the connector and the port.

In one arrangement, the support assembly has a coupling member in communication with the support, the a coupling member configured to engage a faceplate in communication with the circuit board assembly via an opening, defined by the faceplate, to form a latch to couple the support assembly to the faceplate. In one arrangement, the coupling member is in communication with the lip of the support assembly. The latch formed by the connection mechanism and faceplate does not require the use of additional materials (e.g., fasteners) to secure the support assembly to the faceplate thereby minimizing the cost for manufacture and cost of goods sold (COGS) associated with a circuit board module formed, in part, by the support assembly and faceplate.

In one arrangement, the coupling member is configured to align with a chassis fastening mechanism coupled to the faceplate and adjacent to the opening defined by the faceplate. For example, the lip of the support assembly defines a height relative to the support, the height of the lip being configured to align the coupling member with a chassis fastening mechanism coupled to the faceplate and adjacent to the first opening defined by the faceplate. Because the coupling member aligns with a respective chassis fastening mechanisms, the support assembly distributes an associated load (e.g., cable load) to the chassis fastening mechanism. In turn the chassis fastening mechanism distributes the load to the chassis of the computer system, thereby minimizing deflection of the support assembly relative to the faceplate.

The features of the invention, as described above, may be employed in electronic equipment and methods such as those of Cisco Systems of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide mechanisms for supporting a cable connected to a circuit board assembly. A circuit board assembly has an attached support assembly. The support assembly includes a support, such as a handle, and a lip substantially perpendicular to the support. The lip strengthens the support such that, as a cable exerts a load on the support assembly, the lip limits deflection of the support relative to the circuit board assembly. In the case where a cable having a cable connector attaches to a port of the circuit board assembly, the support assembly minimizes displacement of the cable connector relative to the port, thereby minimizing the potential for a break in electrical connections formed between the connector and the port. The support assembly also, in such a case, minimizes strain on a wire bundle and over-molded case forming the cable, thereby limiting damage to the over-molded case and disconnection of the wire bundle to the connector that leads to losses in electrical connections formed between the circuit board assembly and computer devices connected to the circuit board assembly.

Figure 1:
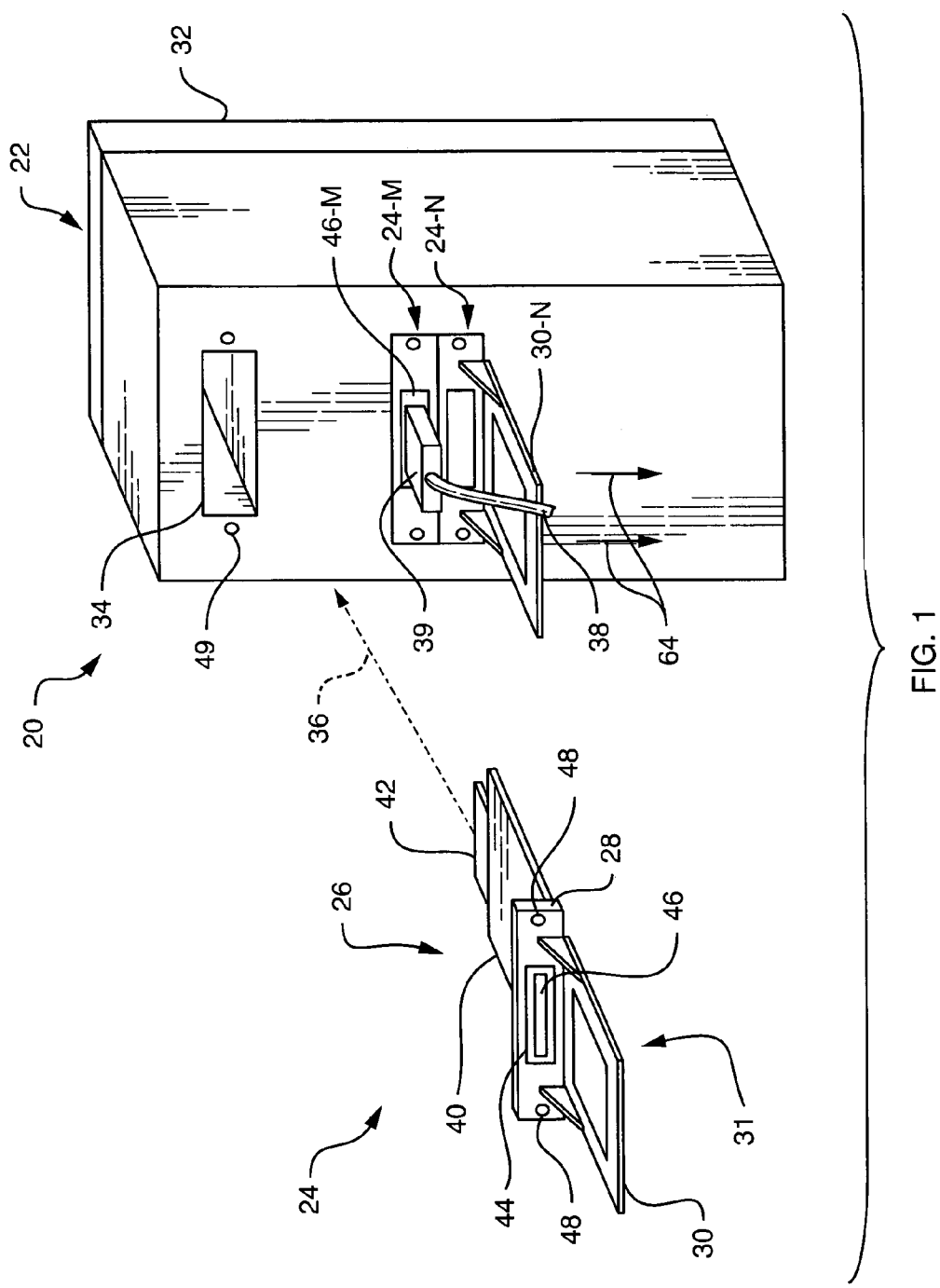
FIG. 1 is a perspective view of a computer system that is suitable for use by embodiments of the invention.

FIG. 1 shows a computer system 20, suitable for use by the invention. The computer system 20 includes a card cage or chassis 22 defining chassis openings 34, a back plane or motherboard 32, and multiple circuit board modules 24. Each circuit board module 24 includes a circuit board assembly (e.g., card assembly) 26, a faceplate 28, and a support assembly 30. The faceplate 28 and support assembly 30 form a faceplate assembly The circuit board assembly 26 includes a circuit board 40, a circuit board connector 42, and a port 46. In one arrangement, the circuit board assembly 26 is configured as a network card assembly, such as a WIC or a HWIC.

The circuit board connector 42 provides electrical attachment between the circuit board 40 and the back plane 32 of the computer system 20. For example, each chassis opening 34 of the chassis 22 provides the circuit board connector 42 of the circuit board assembly 26 with access to the back plane 32 of the computer system 20. When the circuit board assembly 26 inserts within the chassis opening 34 along the direction 36, the circuit board connector 42 electrically couples the circuit board 40 with the back plane 32 of the computer system 20. The port 46 is configured to provide attachment of a cable connector 39 of cable 38 to the circuit board assembly 26. The port 46 allows electrical communication between the computer assembly 20 and an external computerized device connected to the computer assembly via the cable 38.

The faceplate 28 of the circuit board module 24 couples to the circuit board 40 via fasteners, such as rivets, for example. In one arrangement, the faceplate 28 is formed of an electrically conductive material, such as cold-rolled steel, that couples to a ground plane of the circuit board 40 and aids in shielding the circuit board 40 from electromagnetic interference (EMI) radiation. The faceplate 28 is configured to secure the circuit board module 24 to the chassis 22. For example, in one arrangement, the faceplate 28 has fastening mechanisms 48, such as screws, that engage corresponding openings 49 defined by the chassis 22. After a user places the circuit board module 24 within an opening 49 defined by the chassis 22, the user secures the fastening mechanisms 48 within the corresponding openings 49, defined by the chassis 22, to minimize movement of the circuit board module 24 relative to the back plane 32 and chassis 22. The faceplate 28 also defines an opening 44 that provides the cable connector 39 of cable 38 with access to the port 46 of the circuit board assembly 26.

The support assembly 30 of the circuit board module 24 attaches to the circuit board module 24. For example, in one arrangement, the support assembly 30 fastens to the circuit board 40 of the circuit board assembly 26 and fastens to the faceplate 28 of the circuit board module 24. The support assembly 30 is configured to support the weight of a cable 38 connected to the circuit board assembly 26.

For example, as shown in FIG. 1, the computer system 20 includes a first circuit board module 24-N and a second circuit board module 24-M. The first circuit board module 24-N has the cable connector 39 of the cable 38 attached to the port 46-M of the module 24-N and the second circuit board module 24-M has an attached support assembly 30-N. As illustrated, the cable 38 rests on the support assembly 30-N and exerts a load 64 on the support assembly 30-N. As described below, the configuration of the support assembly 30-N withstands the load 64 exerted by the cable 38 such that the support assembly 30-N minimally deflects or rotates, relative to the first circuit board module 24-N, when exposed to the load 64 of the cable 38. The support assembly 30-N, therefore, minimizes displacement of the cable connector 39 of the cable 38 relative to the port 46-M, thereby minimizing the potential for a break in electrical connections formed between the connector 39 and the port 46-M. The support assembly 30-N also, in such a case, minimizes stretching of the wires forming the cable 38, thereby limiting failure of the wires and minimizing losses in electrical connections formed between the circuit board module 24-M and computer devices connected to the module 24-M.

Figure 2:
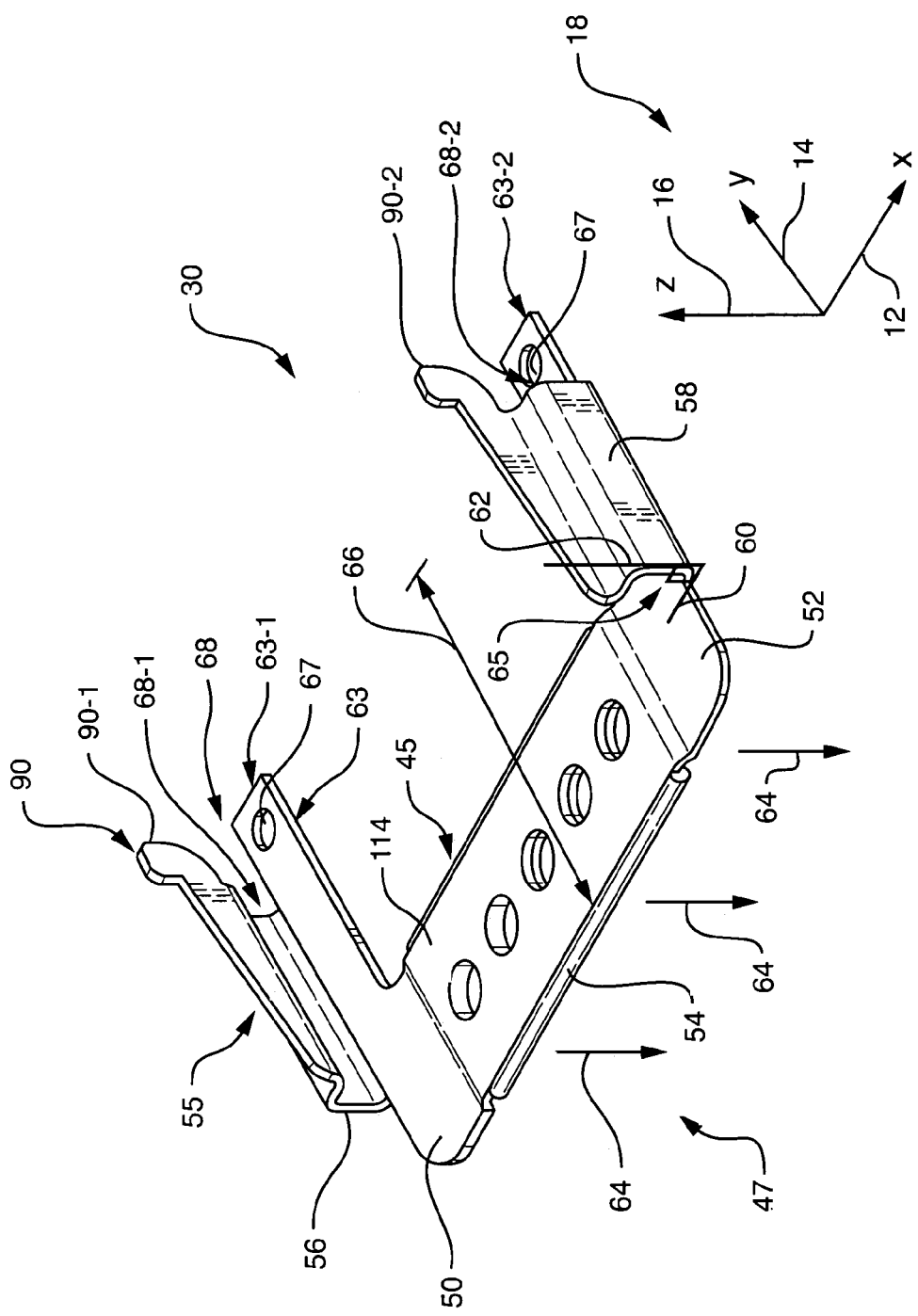
FIG. 2 illustrates a perspective view of a support assembly, according to one embodiment of the invention.

FIG. 2 illustrates, in one arrangement, the support assembly 30 of the circuit board module 24. The support assembly 30 includes a support 45, a connection portion 63 in communication with the support 45, and a lip 55 in communication with the support 45.

The support 45 of the support assembly 30 defines a first plane 60. For example, an x-axis 12 and a y-axis 14 of Cartesian coordinate system 18 define the first plane 60 of the support 45. In one arrangement, the support 45 is configured as a handle 47 having a first arm 50 and a second arm 52. A connector arm 54 couples the first arm 50 and the second arm 52 of the handle 47, for example. When the handle 47 secures to the circuit board module 24, in such an arrangement, the handle 47 allows a user to easily grasp and hold the circuit board module 24 for insertion into, or removal from, the chassis 22 of the computer system 20.

The connection portion 63 of the support assembly 30 is configured to couple the support assembly 30 to a circuit board assembly 26. For example, in one arrangement, the connection portion 63 defines an opening 67 defined by the support 45. In such an arrangement, the connection portion 63 secures the support assembly 30 to the circuit board 40 of the circuit board assembly 26 using fasteners, such as rivets. In the case where the support 45 is configured as a handle 47, the connection portion 63 includes a first connection portion 63-1 in communication with the first arm 58 of the handle 47 and a second connection portion 63-1 in communication with the second arm 58 of the handle 47.

The lip 55 of the support assembly 30 is in communication with the support 45. In one arrangement, the lip 55 is integrally formed with the support 45. For example, a manufacturer stamps a support assembly "blank" from a single piece of material and bends material of the blank to form the lip 55 of the support assembly 30. The lip 55 defines a second plane 62 substantially perpendicular 65 to the first plane 60 defined by the support 45. For example, the y-axis 14 and a z-axis 16 of the Cartesian coordinate system 18 define the second plane 62 of the lip 55. In the case where the support 45 is configured as a handle 47, the lip 55 includes a first lip 56 in communication with the first arm 50 of the handle 47 and a second lip 58 in communication with the second arm 52 of the handle 47.

The lip 55 is configured to provide increased structural strength to the support 45 such that the support 45 resists deflection or bending when exposed to a load 64 (e.g., a load 64 exerted by a cable 38 in contact with the support 45). For example, assume the connector portions 63-1, 63-2 secure the handle 47 to a circuit board assembly 30. Further assume a cable 38, such as illustrated in FIG. 1, generates a load 64 on the connector arm 54 of the handle 47 at a distance 66 relative to the connector portions 63-1, 63-2. The load 64, in turn, generates a bending moment on the handle 47 that creates a tendency for the handle 47 to deflect (e.g., bend) relative to the connector portions 63-1, 63-2 and circuit board assembly 30. Because the lip 55 orients substantially perpendicular to the first plane of the handle 47, the lip 55 structurally strengthens the handle and minimizes the tendency for the handle 47 to deflect relative to the circuit board assembly 30, thereby limiting deflection of the handle 47 relative to the circuit board assembly 30. By limiting deflection of the handle 47, the lip 55 minimizes displacement of a cable connector 39 of the cable 38 (e.g., supported by the handle 47) relative to a corresponding port 46, thereby minimizing the potential for a break in electrical connections formed between the connector 39 and the port 46. Also by limiting deflection of the handle 47, the lip 55 minimizes stretching of the wires forming the cable 38, thereby limiting failure of the wires and minimizing losses in electrical connections formed between the circuit board assembly 26 and computer devices connected to the circuit board assembly 26.

Figure 3:
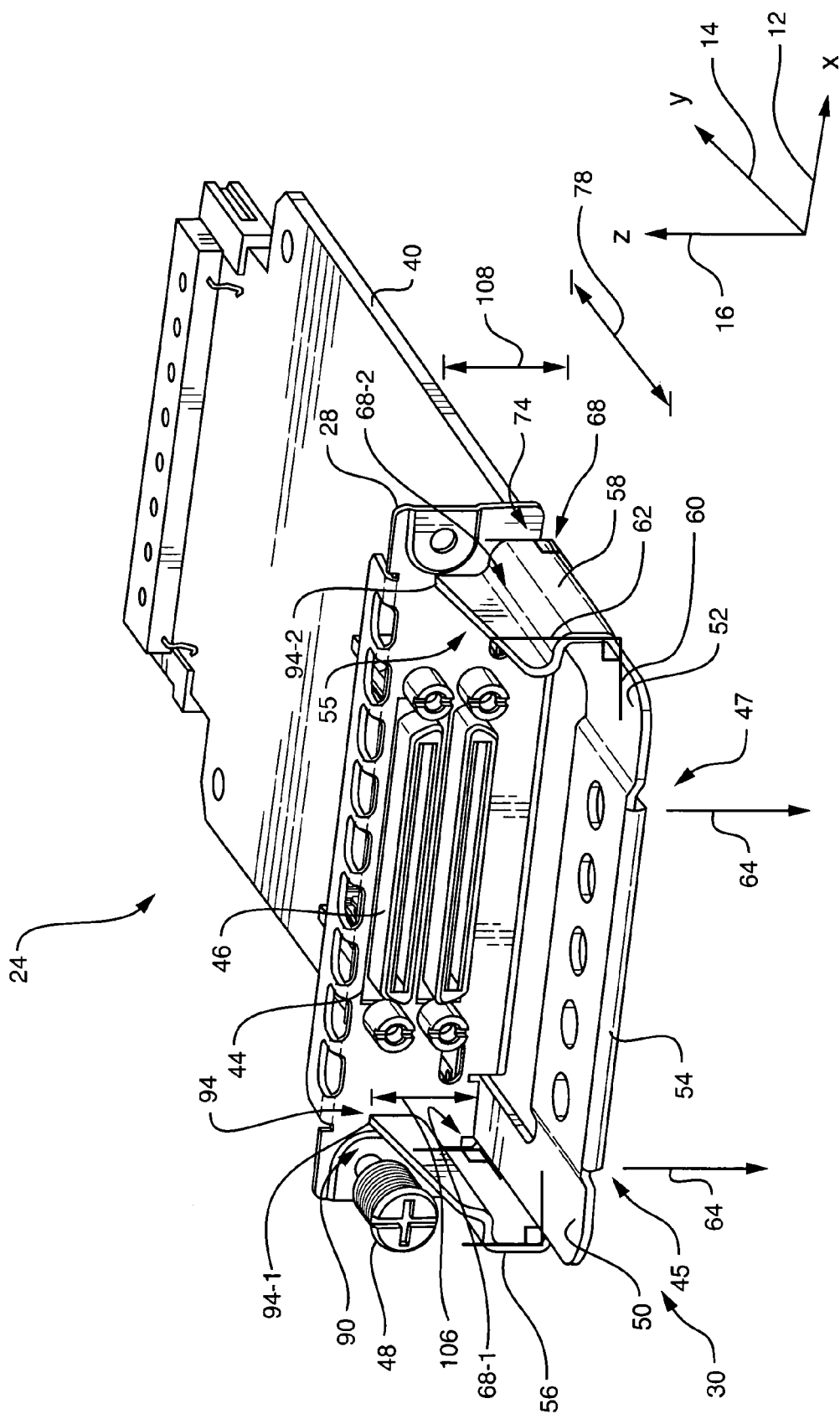
FIG. 3 illustrates a front perspective view of a circuit board module suitable for use by embodiments of the invention.

FIG. 3 illustrates an arrangement of the support assembly 30 coupled to the faceplate 28 and the circuit board assembly 26 of the circuit board module 24. In one arrangement, the lip 55 defines a stop 68 where the stop 68 is substantially perpendicular 74 to the first plane 60 defined by the support

45. In the case where the support 45 is configured as a handle 47, the first lip 56 defines a first stop 68-1 and the second lip 55 defines a second stop 68-2. The stop 68 is configured to contact or abut the faceplate 28 of the circuit board module 24. When the support 54 experiences a load 64, such as generated by a cable 38, that generates a bending moment on the support 54 relative to the connection portion 63, the stop 68 minimize or limits rotation of the support 54 relative to the faceplate 28.

For example, as shown in FIG. 2, assume the support 45 is configured as a handle 47. Further assume a cable 38, such as illustrated in FIG. 1, generates a load 64 on the connector arm 54 of the handle 47 at a distance 66 relative to the connector portions 63-1, 63-2. Returning to FIG. 3, the load 64, in turn, generates a bending moment on the handle 47 that creates a tendency for the handle 47 to rotate relative to the faceplate of the circuit board module 24. Because the stop 68 contacts the faceplate 28, the stop 68 minimizes the tendency for the handle 47 to rotate relative to the faceplate 28 when the handle 47 experiences the load 64, thereby limiting rotation of the handle 47 relative to the faceplate 28. By limiting rotation of the handle 47 relative to the faceplate 28, the stop 69 minimizes displacement of a cable connector 39 of the cable 38 (e.g., supported by the handle 47) relative to a corresponding port 46, thereby minimizing the potential for a break in electrical connections formed between the connector 39 and the port 46.

As indicated above, the support assembly 30 fastens to the circuit board 40 of the circuit board assembly 26. For example, the connection portion 63 of the support assembly 30 couples the support assembly 30 to the circuit board 40 by using fasteners, such as rivets, to maintain a secure relation with between support 45 and the circuit board 40. Also as indicated above, the support assembly 30 also fastens to the faceplate 28 of the circuit board module 24 to provide additional attachment stability for the support 45.

Returning to FIG. 2, the support assembly 30 has a coupling member 90 in communication with the support 54 where the coupling member 90 is configured to engage the faceplate 28 to secure the support assembly 30 to the faceplate 28. In one arrangement, the coupling member 90 is integrally formed with the lip 55 of the support assembly 30. For example, as illustrated in FIG. 3, the first lip 56 has a first coupling member 90-1 and the second lip 58 has a second coupling member 90-2.

Figure 4:
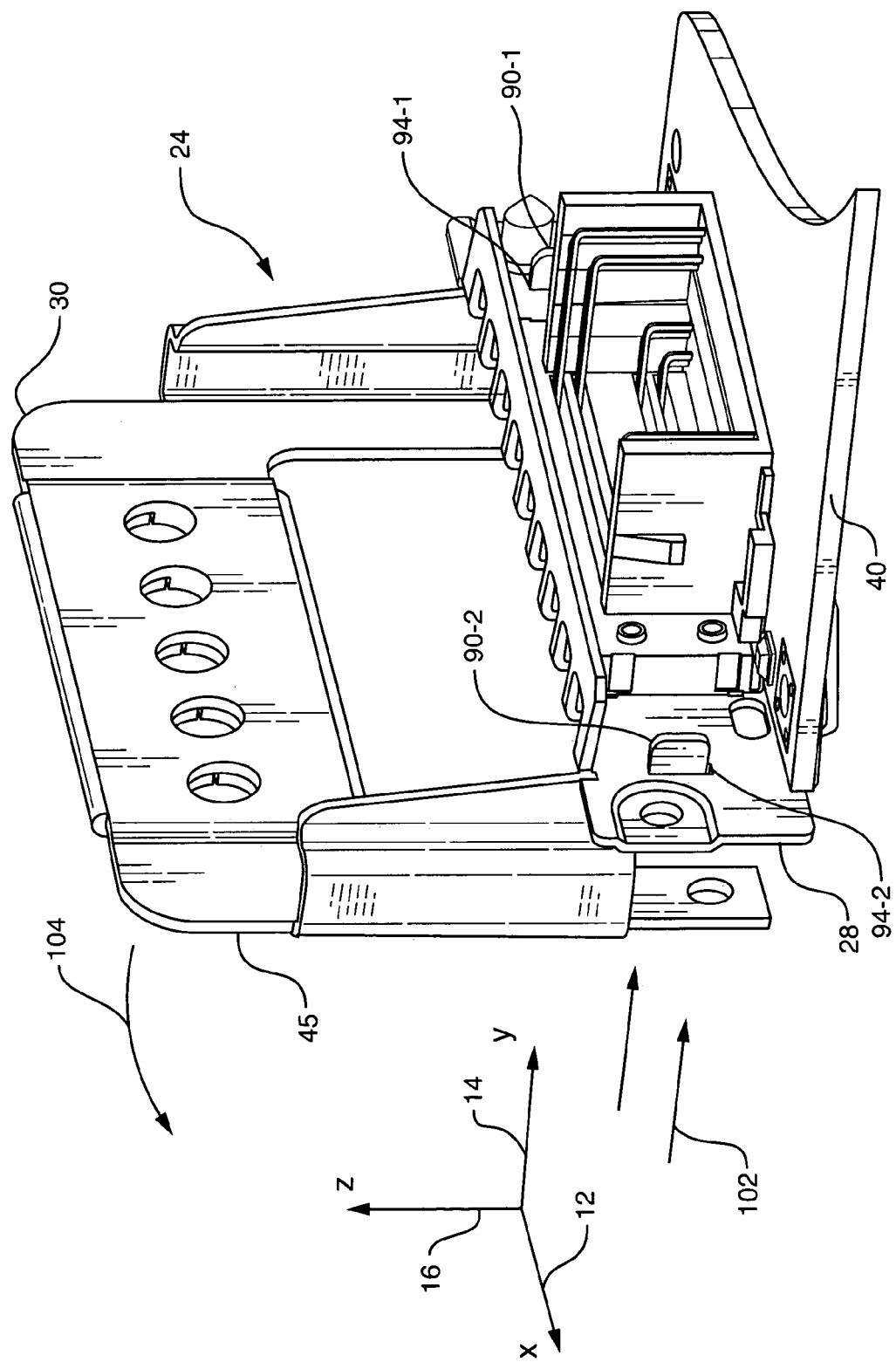
FIG. 4 illustrates assembly of a circuit board module, according to one embodiment of the invention.
Figure 5:
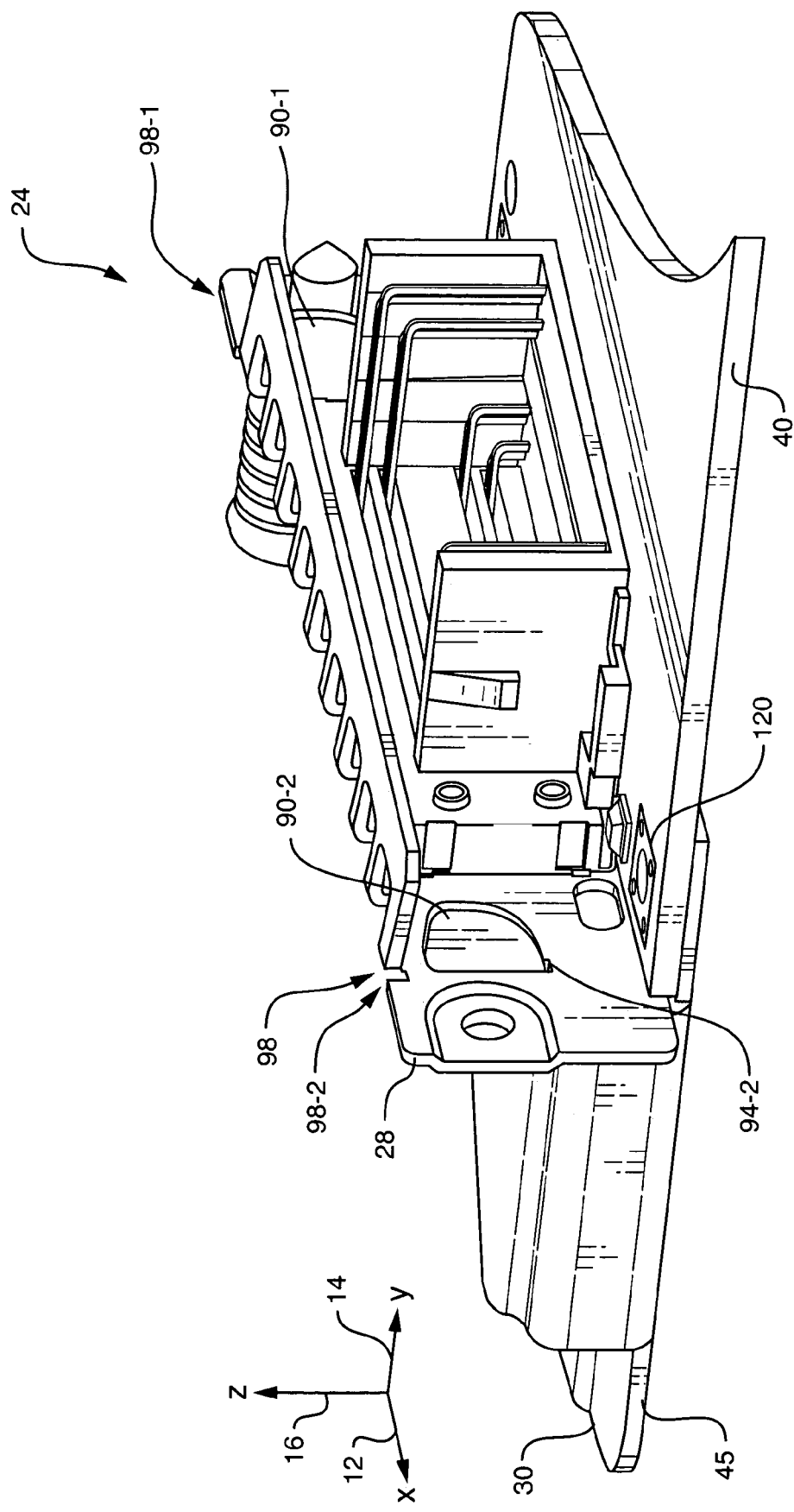
FIG. 5 illustrates an assembled circuit board module, according to one embodiment of the invention.
Figure 6:
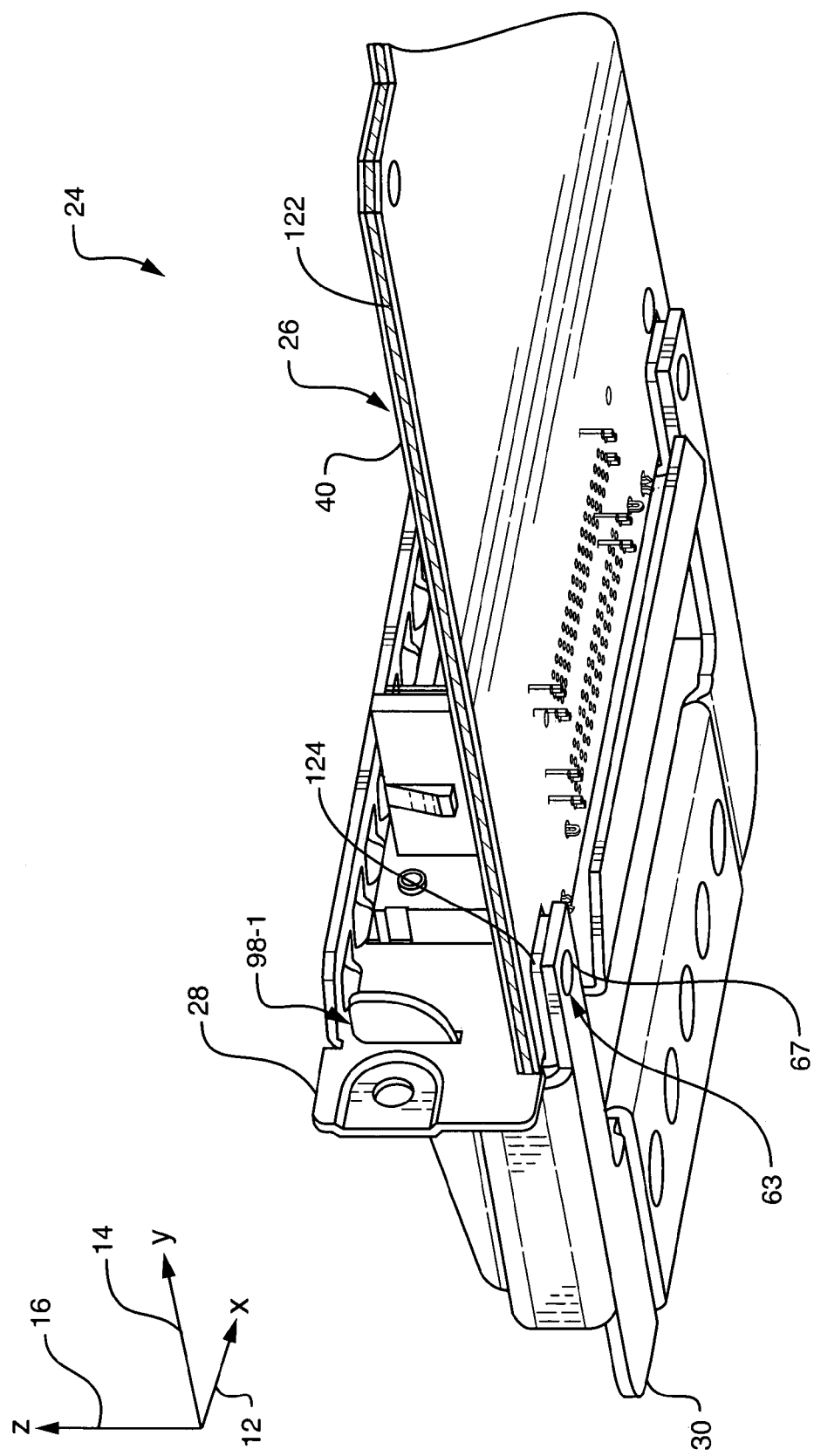
FIG. 6 illustrates a rear perspective view of the circuit board module of FIG. 3, according to one embodiment of the invention.

FIGS. 4, 5, and 6 illustrate the coupling member 90 engaging the faceplate 28 to secure the support assembly 30 to the faceplate 28. The faceplate 28 defines an opening 94 corresponding to the coupling member 90. The coupling member 90 inserts within the opening 94 defined by the faceplate 28 and forms a latch 100 that secures the support assembly 30 to the faceplate 28.

FIG. 4 illustrates the coupling member 90 inserting within the opening 94 of the faceplate 28. For example, as illustrated, the support assembly 30 has a first coupling member 90-1 and a second coupling member 90-2 while the faceplate 28 defines a first opening 94-1 and a second opening 94-2. An assembler, such as a user or technician, aligns the first coupling member 90-1 with the first opening 94-1 and aligns the second coupling member 90-1 with the second opening 94-1. For example, the assembler orients the support assembly 30 relative to the faceplate 28 and the circuit board 40 such that the first plane 60 defined by the support 45 is substantially perpendicular to the circuit board 40 and substantially parallel to the faceplate 28. The assembler then inserts the coupling members 90-1, 90-2 into the respective openings 94-1, 94-2 defined by the faceplate 28. For example, the assembler directs the support assembly 30 along direction 102 to insert the connection portions 90-1, 90-2 into the openings 94-1, 94-2 defined by the faceplate 28.

Once the assembler inserts the coupling members 90-1, 90-2 within the respective openings 94-1, 94-2, the assembler rotates 104 the support assembly 30 relative to the faceplate 28 and circuit board 40. As the assembler rotates 104 the support assembly 30, the coupling members 90-1, 90-2 rotate relative to the respective openings 94-1, 94-2 defined by the faceplate 28. Such rotation of the coupling members 90-1, 90-2 creates a contact between the faceplate 28 and the coupling members 90-1, 90-2.

FIG. 5 illustrates the support assembly 30 in a fully rotated state relative to the faceplate 28 and the circuit board 40. For example in the fully rotated state, the first plane 60 defined by the support 45 is substantially parallel to the circuit board 40 and substantially perpendicular to the faceplate 28. When the assembler fully rotates the support assembly 30 relative to the faceplate 28 and circuit board 40, the assembler creates a latch 98 formed by contact between the coupling member 90 and the faceplate 28. For example, as illustrated in FIG. 6, the circuit board module 24 has a first latch 98-1 formed by contact between the first coupling member 90-1 and the first opening 94-1. While not illustrated, the circuit board module 24 has a second latch 98-2 formed by contact between the second coupling member 90-2 and the second opening 94-2. The latches 98-1, 98-2 limit displacement or movement of the support assembly 30 along the y-axis direction 14 and secure the support assembly 30 to the faceplate 28.

Utilization of the latch 98 to secure the support assembly 30 to the faceplate 28 minimizes assembly costs associated with manufacture of the circuit board module 24. For example, in conventional circuit board modules, a handle typically attaches to a faceplate using fasteners, such as rivets. Such attachment is relatively time consuming and has a cost component associated with the fasteners used to fasten the handle to the faceplate. By contrast, because the latch 28 formed by the connection mechanism 90 and faceplate 28 does not require the use of additional materials (e.g., fasteners) to secure the support assembly 30 to the faceplate 68, use of the latch 28 minimizes the cost for manufacture and cost of goods sold (COGS) associated with the circuit board module 24.

In one arrangement, when the coupling members 90-1, 90-2 engage the faceplate 28, the faceplate constrains motion of the arms 50, 52 corresponding to the respective coupling members 90-1, 90-2 along the x-axis 12 relative to the support assembly 30. Such constraint minimizes bending of the support assembly 30 during operation. For example, FIG. 3 illustrates the handle 47 engaging the faceplate 28. The openings 94-1, 94-2, defined by the faceplate 28, have a width substantially equal to the thickness of the corresponding coupling members 90-1, 90-2. The faceplate 28, therefore, minimizes displacement of the coupling members 90-1, 90-2 within the openings 94-1, 94-2 thereby minimizing displacement of the first arm 56 and second arm 58 along the x-axis 12 relative to the faceplate 28. In the case where a cable 38 generates a load 64 on the connector arm 54 of the handle 47, constraint of the coupling members 90-1, 90-2 and the corresponding arms 56, 58 by the faceplate 28 minimizes sag or displacement of the connector arm 54 relative to the first plane 60 defined by the support assembly 30.

In one arrangement, also as shown by FIG. 3, the support 45 aligns the coupling member 90 with the chassis fastening mechanism 48 coupled to the faceplate 28 and adjacent to the opening 94 defined by the faceplate 28. For example, in the case where the coupling member 90 is integrally formed with the lip 55 of the support assembly 30, to lip 55 defines a height 106 relative to the support 45 such that the height 106 of the lip 55 aligns the coupling member 90 with the chassis fastening mechanism 48 of the faceplate 28 and adjacent to the opening 94 defined by the faceplate 28.

For example, assume the support 45 is configured as a handle 47. When a cable 38, such as shown in FIG. 1, exerts a load 64 on the handle 47, the load 64 generates a bending moment on the handle 47 that creates a tendency for the handle 47 to rotate relative to the faceplate 28 of the circuit board module 24. In the configuration of the circuit board module 24 shown in FIG. 3, the bending moment, in turn, causes the coupling members 90-1, 90-2 to generate a load on the faceplate 28 along the y-axis direction 14. Because the handle 47 aligns the coupling members 90-1, 90-2 relative to the respective chassis fastening mechanisms 48, the handle 47 distributes the load, as generated by the coupling members 90-1, 90-2 on the faceplate 28, to the chassis fastening mechanism 48. In turn the chassis fastening mechanism 48 distributes such a load to the chassis 22 of the computer system 20, thereby limiting or minimizing deflection of the handle 47 relative to the faceplate 28. Minimization of such deflection, therefore, maintains integrity of a connection between the cable 38 and the cable connector 46 of the circuit board assembly 26 and minimizes losses in electrical connections formed between the circuit board assembly 26 and computer devices connected to the circuit board assembly 26.

FIG. 6 illustrates an arrangement of the circuit board module 24 where the circuit board 40 of the circuit board assembly 26 has a ground plane 122. The ground plane 122 provides ground for certain conductive systems associated with the circuit board 40. For example, the ground plane 122 includes system ground layers such as a logic ground layer, a frame ground layer (e.g., a ground for a frame attached to the multi-layer circuit board), and a chassis ground layer (e.g., a ground for a chassis carrying the combination of the multi-layer circuit board and frame).

The connector portion 63 of the support assembly 30 couples with the ground plane 122 of the circuit board assembly 26. In one arrangement, the support assembly 30 is formed of an electrically conductive material, such as a cold rolled steel. Because the connector portion 63 of is formed of an electrically conductive material coupling of the support assembly 30 to the ground plane 122 aids in shielding the circuit board 40 from EMI radiation received by the support assembly 30.

In one arrangement, the circuit board 40 defines a plated through hole 120, shown in FIG. 6. The plated through hole 120 contacts the ground plane 122 of the circuit board 40. When an assembler fastens the support assembly 30 to the circuit board 40, the assembler uses an electrically conductive fastening mechanism (not shown), such as a rivet, to secure the support assembly 30 to the circuit board 40. The conductive fastening mechanism contacts both the connection portion 63 of the support assembly 30 and the plated through hole 120 of the circuit board 40 to create an electrical contact between the support assembly 30 and the granting plane 122.

Figure 7:
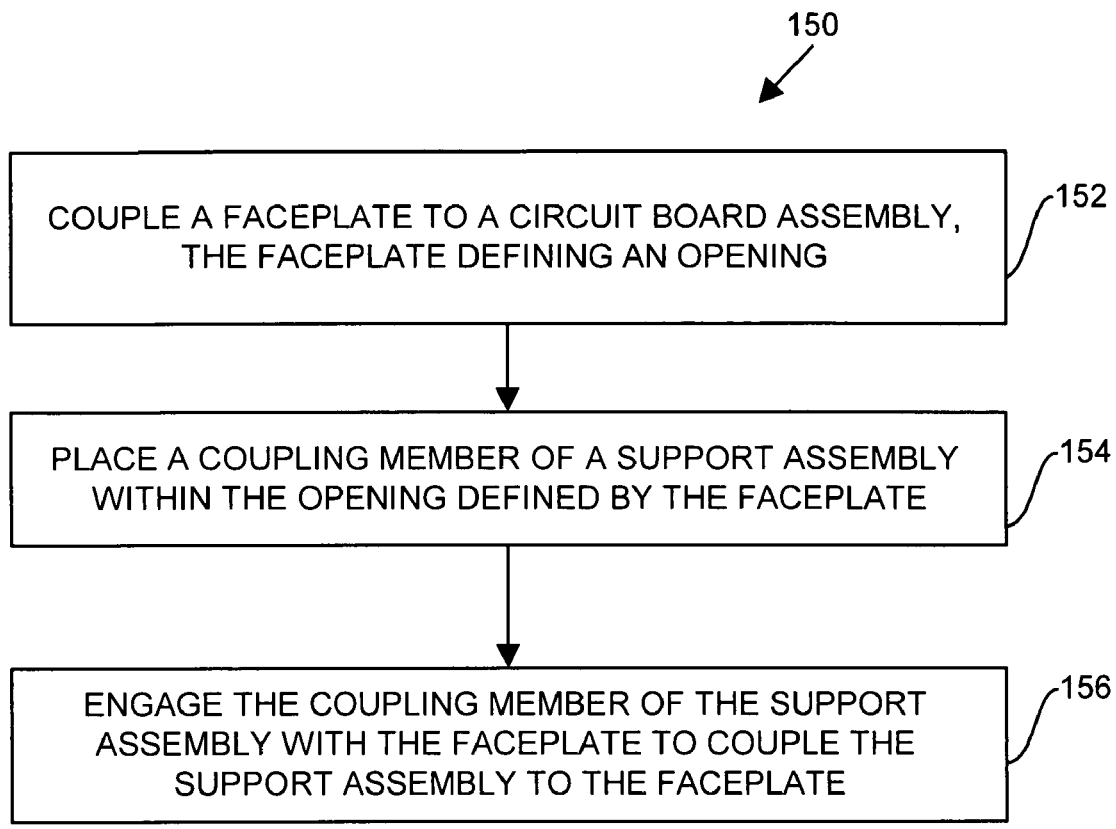
FIG. 7 illustrates a flowchart of a procedure for assembling a circuit board module, according to one embodiment of the invention.

In one arrangement, the connection portion 63 also secures the faceplate 28 to the circuit board 40. For example, as shown in FIG. 7, the connection portion 63 of the support assembly 30 overlaps a circuit board connection portion 124 of the faceplate 28 where the circuit board connection portion 124 defines an opening (not shown). An assembler places a fastening mechanism within the opening 67 defined by the connection portion 63 and within the opening defined by the circuit board connection portion 124 and secures the fastener to the circuit board module 24. The fastening mechanism compresses the circuit board connection portion 124 between the circuit board 40 and the connection portion 63 of the support assembly 30, thereby securing the faceplate 28 to the circuit board 40.

As indicated above, in one arrangement, the faceplate 28 and the support assembly 30 are both formed from electrically conductive materials. As the connection portion 63 of the support assembly 30 contacts both the ground plane 122 of the circuit board 40 and the faceplate 38, the support assembly 30 couples the faceplate 28 to the ground plane 122. Such coupling also minimizes EMI interference to the circuit board 40 as caused by the faceplate 28.

FIG. 7 illustrates a method 150 for assembling a circuit board module 24, according to one embodiment of the invention. Such a method can be performed either manually (e.g., by a technician on an assembly line) or automatically (e.g., by automated equipment).

In step 152, an assembler couples a faceplate 28 to a circuit board assembly 26, the faceplate 28 defining an opening 94. For example, in one arrangement the assembler couples the faceplate 28 to a circuit board 44 of the circuit board assembly 26 using fasteners, such as rivets.

In step 154, the assembler places a coupling member 90 of a support assembly 30 within the opening 94 defined by the faceplate. For example, in the case where the support assembly 30 has a first coupling member 90-1 and a second coupling member 90-2 and the faceplate 28 defines a first opening 94-1 and a second opening 94-2, the assembler aligns the first coupling member 90-1 with the first opening 94-1 and aligns the second coupling member 90-1 with the second opening 94-1. The assembler then inserts the coupling members 90-1, 90-2 into the respective openings 94-1, 94-2 defined by the faceplate 28.

In step 154, the assembler engages the coupling member 90 of the support assembly 30 with the faceplate 28 to couple the support assembly 30 to the faceplate 28. For example, the assembler rotates the support assembly 30 relative to the faceplate 28 to form a latch 98 with the coupling member 90 and the faceplate 28. The latch 98 limits displacement or movement of the support assembly 30 relative to the faceplate and secures the support assembly 30 to the faceplate 28.

Those skilled in the art will understand that there can be many variations made to the embodiments explained above while still achieving the same objective of those embodiments and the invention in general.

In one arrangement as shown in FIG. 2, the support 45 defines a cable attachment opening 114. For example, in the case where the support 45 is configured as a handle 47, the handle 47 defines cable attachment openings 114 within the connector arm 54. The cable attachment opening 114 provides a user with a location to secure a cable 38 to the handle 47 to minimize motion of the cable 38 relative to the handle 47, thereby maintaining integrity of a connection between the cable 38 and the circuit board assembly 26.

For example, in certain cases, during operation, a computer system 20 exposes an attached cable 38 to vibrations that, in turn, load and unload the cable 38 at a connection between a cable connector 39 of the cable 38 and a port 46 of the computer system 20. In the case where the cable 38 does not secure to the support 45, the cable connector 39 of the cable 38 can disconnect from the port 46 of the circuit board assembly 26. The openings 114 provide the user with locations to tie or fasten the cable 38 to the support 45 and minimize disconnection of the cable connector 39 from the associated port 46 caused by vibration of the computer system 20.

As indicated above, the support assembly 30 is formed of an electrically conductive material, such as cold-rolled steel. In one arrangement, such a support assembly 30 has a zinc plating. The zinc plating minimizes chemical degradation (e.g., rusting) of the support assembly 30 and limits failure of the support assembly 30 as caused by such chemical degradation.

As indicated above, the structure of the support assembly 30 minimizes deflection of the support assembly 30 relative to the circuit board assembly 26. In order to minimize bending of a handle when exposed to the weight of the cables of a computer system, a manufacturer can increase the thickness of the metal material that forms the handle. By increasing the thickness of the handle, the manufacturer allows the handle to support a relatively large amount of weight generated by the cables of the computer system. However, by simply increasing the thickness of the handle (e.g., requiring additional material to form the handle), the manufacturer increases the cost for manufacturing the handle, and therefore, the card assembly. Furthermore, the card assemblies typically mount within expansion slots of the computer system, each of the expansion slots having existing, preset space constraint. By increasing the thickness of the handle to minimize bending of the handle and allowed support the weight of the cable, a card assembly having such a handle would not necessarily fit within the expansion slots based upon the space constraints of existing expansion slots. Therefore, the configuration of the support assembly 30 provides support to the weight or load generated by the cables 30 of the computer system 20 while maintaining the geometric constraints required by the computer system 22 and while limiting the costs associated with assembly of the circuit board modules 24.

Such variations are intended to be covered by the scope of this invention. As such, the foregoing description of embodiments of the invention is not intended to be limiting. Rather, any limitations to the invention are presented in the following claims.

What is claimed is:

1. A support assembly for supporting at least one cable connected to a circuit board assembly, the support assembly comprising:
    a support defining a first plane;
    a connection portion in communication with the support, the connection portion configured to couple with the circuit board assembly;
    a lip in communication with the support, the lip defining a second plane substantially perpendicular to the first plane defined by the support, the lip configured to limit deflection of the support relative to the circuit board assembly when the connection portion couples with the circuit board assembly and the at least one cable exerts a load on the support; and
    a coupling member in communication with the support, the coupling member configured to engage a faceplate in communication with the circuit board assembly via an opening, defined by the faceplate, to form a latch to couple the support assembly to the faceplate;
    wherein the connection portion is configured to couple with a circuit board of the circuit board assembly.

2. The support assembly of claim 1 wherein the lip of the support assembly defines a stop, the stop substantially perpendicular to the first plane defined by the support and configured to abut a faceplate in communication with the circuit board assembly, the stop configured to limit rotation of the support relative to the faceplate when the at least one cable exerts a load on the support.

3. The support assembly of claim 2 wherein the coupling member is in communication with the lip, the coupling member configured to engage the faceplate via the opening, defined by the faceplate, to form the latch, the latch configured to couple the support assembly to the faceplate.

4. The support assembly of claim 3 wherein the lip defines a height relative to the support, the height of the lip configured to align the coupling member with a chassis fastening mechanism coupled to the faceplate and adjacent to the first opening defined by the faceplate.

5. The support assembly of claim 1 wherein the coupling member is configured to align with a chassis fastening mechanism coupled to the faceplate and adjacent to the opening defined by the faceplate.

6. The support assembly of claim 1 wherein the connection portion is configured to couple with a ground plane of the circuit board assembly.

7. The support assembly of claim 1 wherein:
    the support comprises a handle having a first arm and a second arm in communication with the first arm, the handle configured to couple with the circuit board assembly; and
    the lip comprises a first lip in communication with the first arm, the first lip defining a first plane substantially perpendicular to the first arm and a second lip in communication with the second arm, the second lip defining a second plane substantially perpendicular to the second arm, the first lip and the second lip configured to limit deflection of the handle relative to the circuit board assembly when the at least one cable exerts a load on the handle.

8. The support assembly of claim 1 wherein the coupling member comprises a tab extending from the support in a direction substantially perpendicular to the first plane defined by the support.

9. A faceplate assembly comprising:
    a faceplate configured to couple to a circuit board assembly, the faceplate defining an opening configured to provide access to a cable connector of the circuit board assembly; and
    a support assembly for supporting at least one cable connected to the cable connector of the circuit board assembly, the support assembly in communication with the faceplate and the support assembly having:
        a support defining a first plane;
        a connection portion in communication with the support, the connection portion configured to couple with the circuit board assembly;
        a lip in communication with the support, the lip defining a second plane substantially perpendicular to the first plane defined by the support, the lip configured to limit deflection of the support relative to the circuit board assembly when the connection portion couples with the circuit board assembly and the at least one cable exerts a load on the support; and
        a coupling member in communication with the support, the a coupling member configured to engage the faceplate via an opening, defined by the faceplate, to form a latch to couple the support assembly to the faceplate;
        wherein the connection portion is configured to couple with a circuit board of the circuit board assembly.

10. The faceplate assembly of claim 9 wherein the lip of the support defines a stop, the stop substantially perpendicular to the first plane defined by the support and configured to abut the faceplate in communication with the circuit board assembly, the stop configured to limit rotation of the support relative to the faceplate when the at least one cable exerts a load on the support.

11. The faceplate assembly of claim 10 wherein the coupling member is in communication with the lip, the coupling member configured to engage the faceplate via the opening, defined by the faceplate, to form the latch, the latch configured to couple the support assembly to the faceplate.

12. The faceplate assembly of claim 11 wherein:
the faceplate comprises a chassis fastening mechanism; and
the lip defines a height relative to the support, the height of the lip configured to align the coupling member with the chassis fastening mechanism coupled to the faceplate and adjacent to the first opening defined by the faceplate.

13. The faceplate assembly of claim 9 wherein the coupling member is configured to align with a chassis fastening mechanism coupled to the faceplate and adjacent to the opening defined by the faceplate.

14. The faceplate assembly of claim 9 wherein the connection portion is configured to couple with a ground plane of the circuit board assembly.

15. The faceplate assembly of claim 9 wherein:
the support comprises a handle having a first arm and a second arm in communication with the first arm, the handle configured to couple with the circuit board assembly; and
the lip comprises a first lip in communication with the first arm, the first lip defining a first plane substantially perpendicular to the first arm and a second lip in communication with the second arm, the second lip defining a second plane substantially perpendicular to the second arm, the first lip and the second lip configured to limit deflection of the handle relative to the circuit board assembly when the at least one cable exerts a load on the handle.

16. A circuit board module comprising:
a circuit board assembly having a circuit board and a cable connector coupled to the circuit board; and
a faceplate assembly including:
a faceplate coupled to the support mount of the circuit board assembly and defining an opening to provide access to the cable connector; and
a support assembly for supporting at least one cable connected to the cable connector of the circuit board assembly, the support assembly in communication with the faceplate and the support assembly having:
a support defining a first plane;
a connection portion in communication with the support, the connection portion coupled with the circuit board assembly;
a lip in communication with the support, the lip defining a second plane substantially perpendicular to the first plane defined by the support, the lip configured to limit deflection of the support relative to the circuit board assembly when the at least one cable exerts a load on the support; and
a coupling member in communication with the support, the a coupling member engaging the faceplate via an opening, defined by the faceplate, to form a latch to couple the support assembly to the faceplate;
wherein the connection portion is coupled with the circuit board of the circuit board assembly.

17. The circuit board module of claim 16 wherein the lip of the support defines a stop, the stop substantially perpendicular to the first plane defined by the support and in communication with the faceplate, the stop configured to limit rotation of the support relative to the faceplate when the at least one cable exerts a load on the support.

18. The circuit board module of claim 17 wherein the coupling member is in communication with the lip, the coupling member configured to engage the faceplate via the opening, defined by the faceplate, to form the latch, the latch configured to couple the support assembly to the faceplate.

19. The circuit board module of claim 18 wherein:
the faceplate comprises a chassis fastening mechanism; and
the lip defines a height relative to the support, the height of the lip aligning the coupling member with the chassis fastening mechanism coupled to the faceplate and adjacent to the first opening defined by the faceplate.

20. The circuit board module of claim 16 wherein the coupling member aligns with a chassis fastening mechanism coupled to the faceplate and adjacent to the opening defined by the faceplate.

21. The circuit board module of claim 16 wherein the connection portion couples with a ground plane of the circuit board assembly.

22. The circuit board module of claim 16 wherein:
the support comprises a handle having a first arm and a second arm in communication with the first arm, the handle configured to couple with the circuit board assembly; and
the lip comprises a first lip in communication with the first arm, the first lip defining a first plane substantially perpendicular to the first arm and a second lip in communication with the second arm, the second lip defining a second plane substantially perpendicular to the second arm, the first lip and the second lip configured to limit deflection of the handle relative to the circuit board assembly when the at least one cable exerts a load on the handle.

23. A method for assembling a circuit board module comprising:
coupling a faceplate to a circuit board assembly, the faceplate defining an opening;
placing a coupling member of a support assembly within the opening defined by the faceplate, the support assembly having:
a support defining a first plane;
a connection portion in communication with the support, the connection portion configured to couple with the circuit board assembly; and
a lip in communication with the support, the lip defining a second plane substantially perpendicular to the first plane defined by the support, the lip configured to limit deflection of the support relative to the circuit board assembly when the at least one cable exerts a load on the support; and
engaging the coupling member of the support assembly with the faceplate to couple the support assembly to the faceplate.

24. The method of claim 23 comprising rotating the support assembly relative to the faceplate to form a latch with the coupling member and the faceplate.

25. The method of claim 23 further comprising abutting a stop of the support assembly against the faceplate, the lip of the support defining the stop, the stop substantially perpendicular to the first plane defined by the support, and the stop limiting rotation of the support relative to the faceplate when at least one cable exerts a load on the support.

26. The method of claim 23 comprising coupling the connection portion with a circuit board of the circuit board assembly.

27. A support assembly for supporting at least one cable connected to a circuit board assembly, the support assembly comprising:

a support having a coupling member configured to insert within an opening of a faceplate of the circuit board assembly to couple the support to the faceplate;

at least one arm extending from the support plate, the at least one arm having a connection portion configured to couple to a circuit board of the circuit board assembly and configured to electrically couple with a ground plane of the circuit board; and a lip extending from at least a portion of the support, the lip configured to limit deflection of the support relative to the circuit board assembly when the connection portion couples with the circuit board assembly and the at least one cable exerts a load on the support.

* * * * *